US010262482B1

United States Patent
Zhu et al.

(10) Patent No.: US 10,262,482 B1
(45) Date of Patent: Apr. 16, 2019

(54) HIGH SECURITY DOCUMENT STORAGE AND RETRIEVAL SYSTEM

(71) Applicants: Shengbo Zhu, San Jose, CA (US); Su Shiong Huang, Belleville, WA (US)

(72) Inventors: Shengbo Zhu, San Jose, CA (US); Su Shiong Huang, Belleville, WA (US)

(73) Assignee: MICRODATA CORPORATION, San Jose, CA (US)

( * ) Notice: Subject to any disclaimer, the term of this patent is extended or adjusted under 35 U.S.C. 154(b) by 0 days.

(21) Appl. No.: 15/998,123

(22) Filed: Jul. 5, 2018

(51) Int. Cl.
  *G07C 9/00* (2006.01)
  *G06F 17/30* (2006.01)
  *G06F 17/24* (2006.01)
  *G08B 5/36* (2006.01)
  *G06F 21/62* (2013.01)

(52) U.S. Cl.
  CPC ......... *G07C 9/00142* (2013.01); *G06F 17/24* (2013.01); *G06F 17/30011* (2013.01); *G06F 21/6218* (2013.01); *G08B 5/36* (2013.01)

(58) Field of Classification Search
  CPC ................. G07C 9/00142; G06F 17/24; G06F 17/30011; G06F 21/6218; G08B 5/36
  See application file for complete search history.

(56) References Cited

U.S. PATENT DOCUMENTS

2012/0002244 A1* 1/2012 Rothschild ........ G06F 17/30011
  358/403
2017/0085527 A1* 3/2017 Zhu ........................ G08B 5/36

* cited by examiner

*Primary Examiner* — Curtis B Odom (57) ABSTRACT

A document storage and retrieval system for securely storing documents. A mass storage device contains document identification data and document location information but not the document data. A host computer extracts the document identification data and document location information from the mass storage device and sends this information to a storage cabinet containing the document. Each document is removably stored in a file folder contained in a cabinet drawer. Each file folder has a memory unit which stores an electronic version of each physical document contained in the file folder. The host computer directs the initial storage of a document in folder memory. Thereafter, the host computer is denied access to the electronic versions stored in file folder memory. Access to the electronic versions is only possible using a special reader device.

11 Claims, 10 Drawing Sheets

PRIOR ART

HIGH SECURITY DOCUMENT STORAGE AND RETRIEVAL SYSTEM

BACKGROUND OF THE INVENTION

This invention relates to document storage and retrieval systems in general, and in particular to an improved document storage and retrieval system with heightened security against unauthorized access and retrieval of documents stored in the system (e.g. "hacking").

Figure 1:
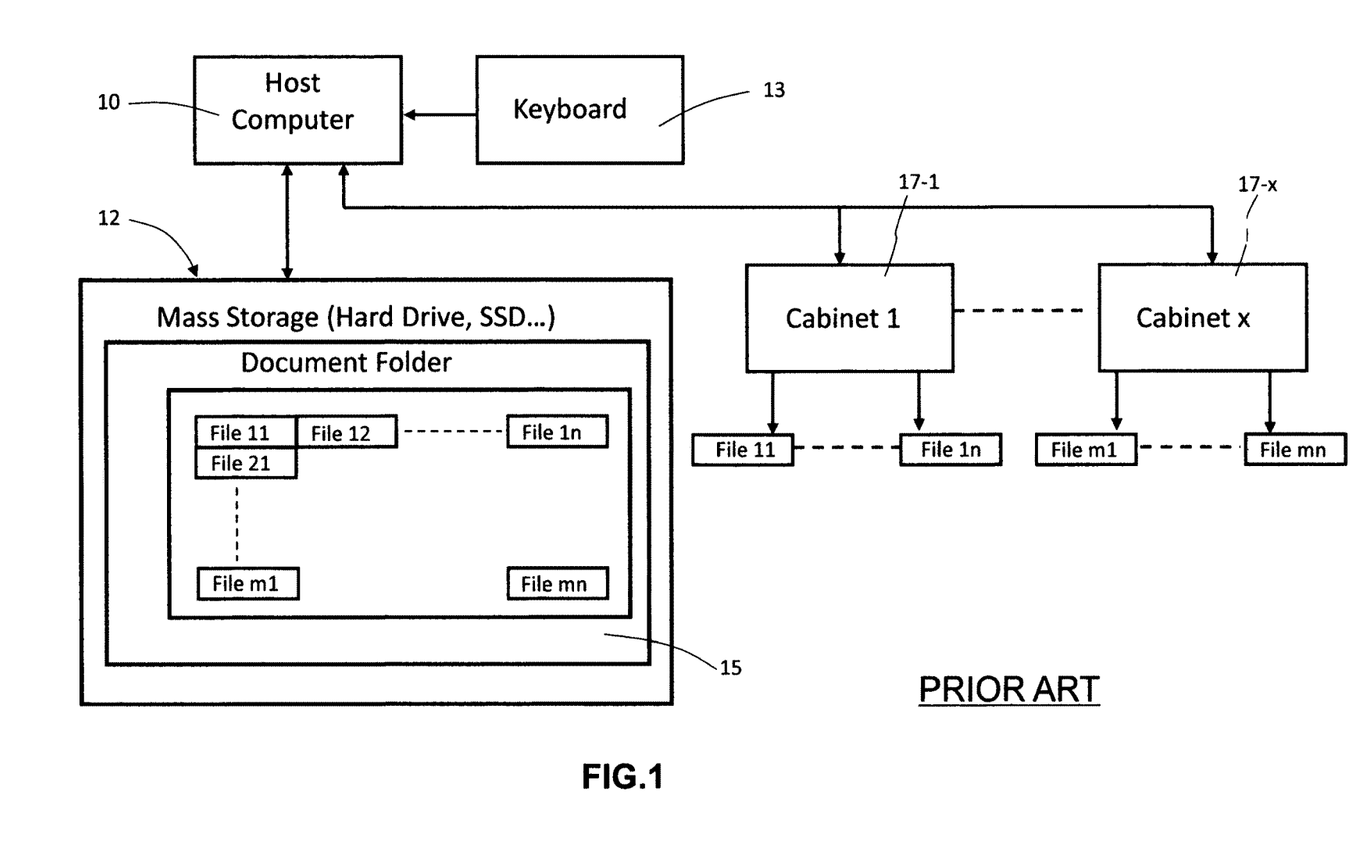
FIG. 1 is a schematic block diagram of a prior art document storage and retrieval system.

Document storage and retrieval systems are well-known and widely deployed throughout various industries for document management purposes. FIG. 1 illustrates a typical system in use today. As seen in this Fig., a host computer 10 is operatively coupled to a mass storage device 12, in which documents registered in the system are stored in electronic form. Host computer 10 responds to commands issued by an operator using a standard keyboard device 13 by accessing documents specified by keyboard device 13 from mass storage device 12. Once accessed, a document can be viewed on a display (not illustrated), printed out as hard copy by a printer (not illustrated), or transferred to some other location. The documents stored in mass storage device 12 are typically arranged in virtual document folders-such as folder 15 and each document in a given folder 15 is assigned a file designation-such as files 11, 12 . . . , 1n, 21, . . . 2n, . . . , m1, . . . , mn. To access a specific document, the operator enters a document identifier using keyboard device 13, host computer 10 uses the document identifier to find the document folder 15 in which the document resides, and retrieves the file corresponding to the specified document for further processing, such as editing, copying or printing.

Some documents in the system shown in FIG. 1 may be purely electronic—i.e. no corresponding physical version of the document exists. Examples of purely electronic documents are e-mail messages and attachments thereto, office memorandums and the like. Other documents may have both electronic versions and physical versions. Examples of this type of document are deeds to real property, legal court decisions and the like. For this latter type, the electronic version is stored in mass storage device 12 while the physical version is stored in a storage unit, which is typically a file cabinet 17-1, . . . , 17X having one or more drawers in which file folders 11, . . . , 1n, . . . , m1, . . . , mn are removably suspended on support rails. The individual physical versions of the documents are received in the file folders and are capable of being manually removed from their respective file folders. Each file cabinet is provided with a microcontroller unit (Cabinet MCU) containing a unique identification code character serving to uniquely identify that cabinet in the system. Communication between host computer 10 and the various storage units is via a hard wire connection 18 or via wireless devices (not illustrated).

Figure 2:
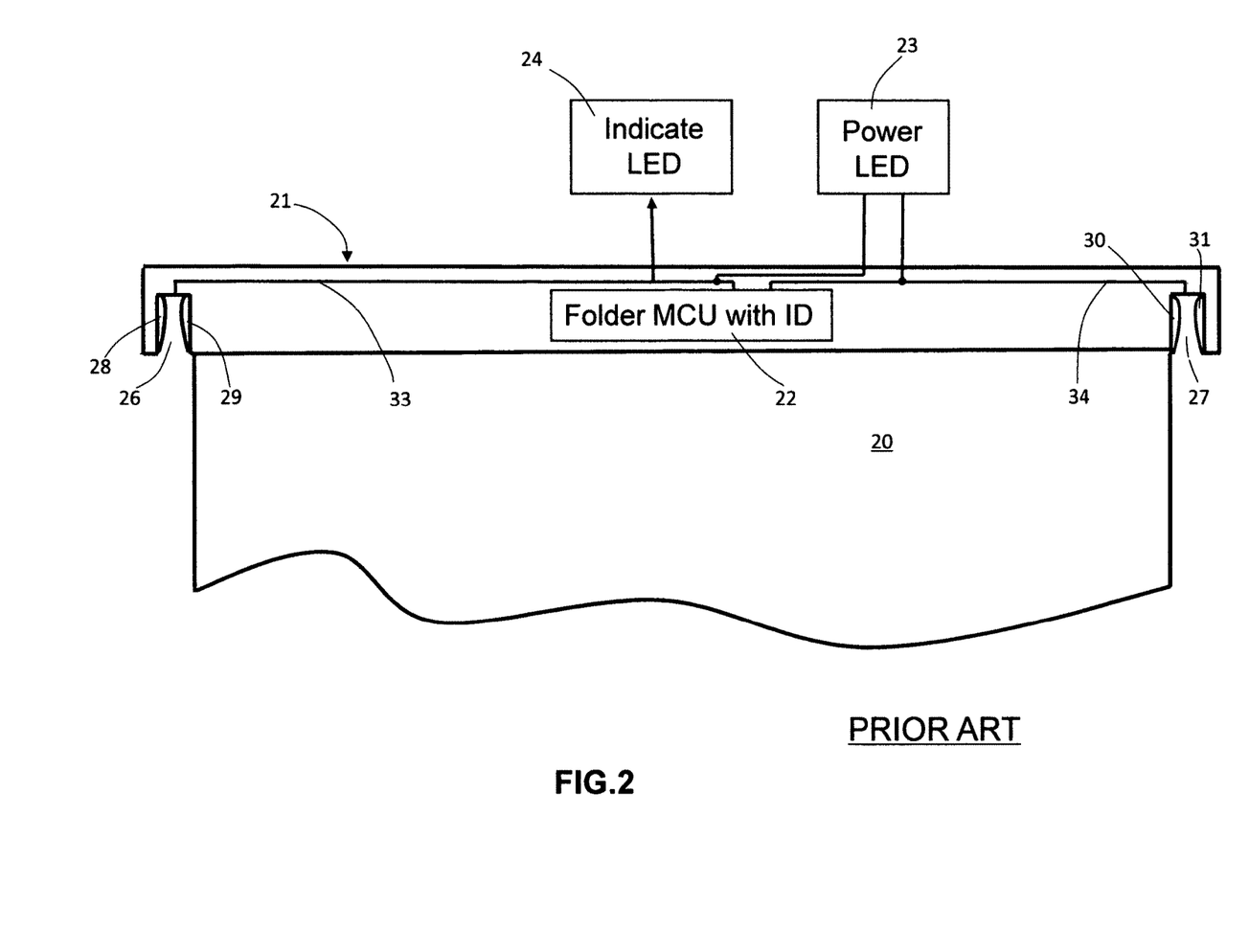
FIG. 2 is a schematic partial block diagram of a prior art file folder support brace with electronic elements.

To facilitate access to the cabinet and drawer location of the physical version of a document, the file folders are provided with electronic elements shown in FIG. 2 which enable communication between host computer 10 and the file folders. As seen in this Fig., each file folder 20 has a support brace 21 attached to the upper margin of the main body portion of file folder 20. Support brace 21 is formed from an electrically non-conductive material-such as printed circuit board material- and carries a folder Microcontroller unit 22 (MCU 22), a power LED 23 and an Indicate LED 24, both of which are electrically coupled to and controlled by MCU 22. Support brace 20 has a pair of inverted notches 26, 27 at opposite ends which are dimensioned to receive the cabinet drawer support rails (not illustrated). Each notch 26, 27 is provided with a pair of electrically conductive springs (springs 28, 29 for notch 26; springs 30, 31 for notch 27) which mate with corresponding electrical conductors carried by the drawer support rails (not illustrated) when the folder 20 is properly installed in a cabinet drawer. The electrical conductors carried by the drawer support rails are coupled to host computer 10. Springs 28, 29 are electrically coupled to MCU 22 by conductive paths 33 formed on support brace 21, while springs 30, 31 are electrically coupled to MCU 22 by conductive paths 34 formed on support brace 21. MCU 22 contains a unique identification code character serving to uniquely identify the file folder 20 which contains the MCU 22.

Figure 3:
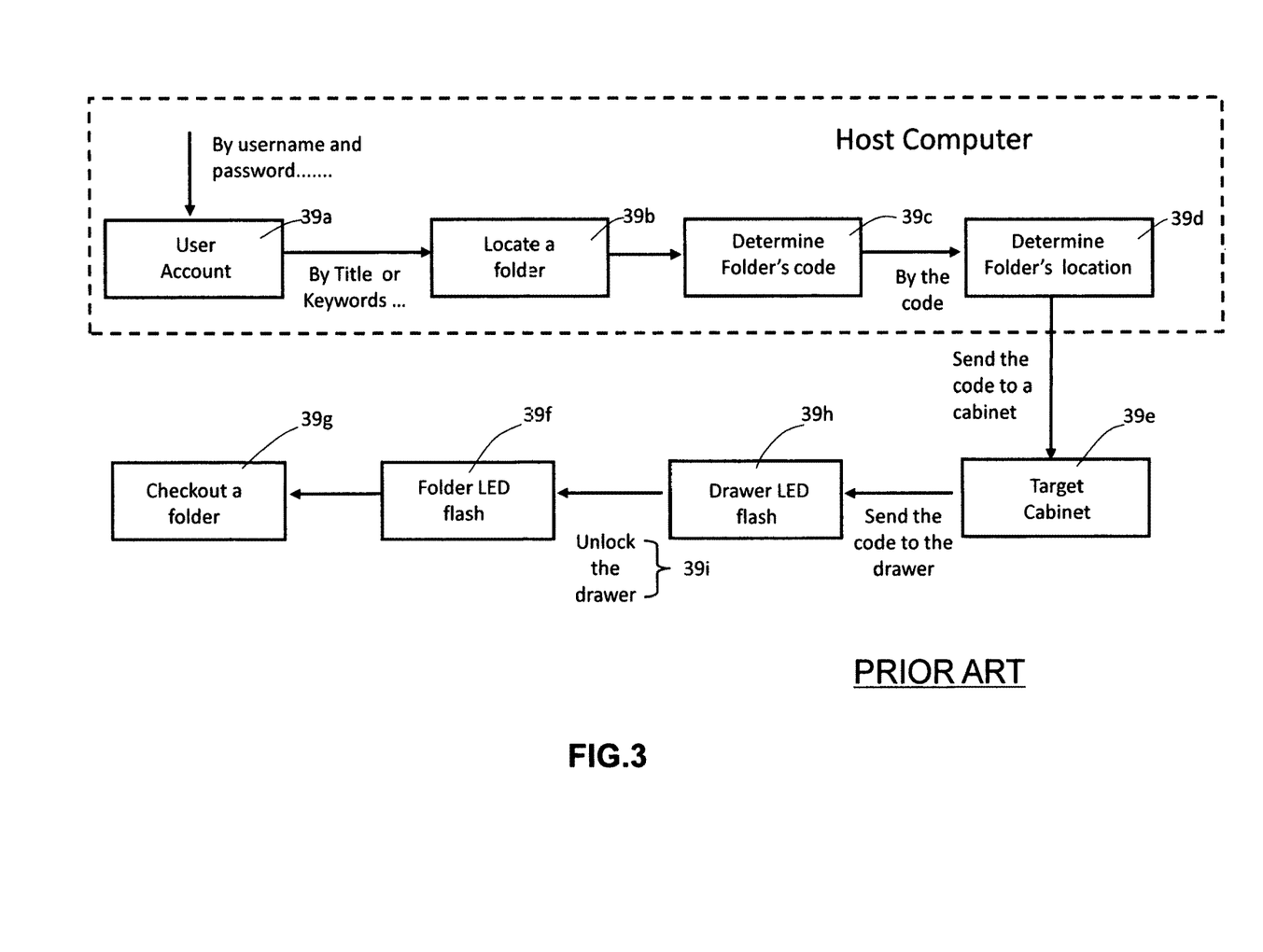
FIG. 3 is a flow chart illustrating the retrieval process for a physical version of a document stored in the system of FIG. 1.

The process of locating the physical version of a document is illustrated in FIG. 3. As seen in this Fig., the user gains access to their user account by entering a user name and password into host computer 10 using keyboard device 13 (step 39a). Once access is gained the user enters the title or other keywords of the document sought. The host computer 10 uses this information to locate in mass storage device 12 the corresponding virtual folder in which the electronic version of the document is stored (step 39b). The virtual folder contains the identification code character of the corresponding physical folder 20 (step 39c). Host computer 10 uses this identification code character to determine the cabinet and drawer in which the physical folder 20 is located by consulting a table of folder locations (step 39d). Once the location of the physical folder 20 is determined, host computer 10 sends the folder identification code character to the destination cabinet and drawer (step 39e), and the code character is conveyed to MCU 22 of physical file folder 20. When MCU 22 receives the code character, it activates the Indicate LED 24, which visually alerts the user of the file folder 20 containing the sought document (step 39f). The user then removes the found folder 20 and locates the physical version of the sought document (step 39g). To aid the user further, each cabinet drawer is provided with an LED mounted on the front panel, which is activated when the cabinet receives the code character to provide a visual indication of the drawer to open (step 39h). In addition, each cabinet drawer is preferably provided with a drawer lock which is released when the code character is received by the cabinet (step 39i).

While the known system described above has been proven to be highly useful in document management applications for efficiently storing and retrieving electronic versions of documents and their physical versions, it suffers from one significant disadvantage-viz., vulnerability to unauthorized access to the electronic versions of all documents stored in mass storage device 12 (i.e. "hacking into the system"). While there are numerous contemporary examples of such unauthorized intrusions resulting in the compromise of confidential information contained in such documents, efforts to date to ensure the security of known document storage and retrieval systems have not met with success.

SUMMARY OF THE INVENTION

The invention comprises a document storage and retrieval system which is devoid of the disadvantage noted above with known such systems and which provides impenetrable security for documents stored in both electronic form and physical form.

From a system aspect the invention comprises a document storage and retrieval system having a host computer; a mass storage device coupled to the host computer, the mass storage device containing document identification data and document location data specifying the location of a document in the system; a storage cabinet coupled to the host computer, the storage cabinet having at least one drawer for removably receiving file folders containing documents in physical form; a file folder removably received in the drawer, the file folder containing a document in physical form and having a memory for storing an electronic version of the document, the memory bring configured to be unaccessible by the host computer after the electronic version has been stored therein so that access to the document can only be obtained by removing the file folder from the drawer.

The host computer and the file folder memory are configured to permit access to the memory by the host computer for the purpose of initially storing the electronic version of the document in the memory and to deny access by the host computer to the electronic version of the document thereafter.

The system further includes a reader device configured to be electrically coupled to the file folder memory to read out the electronic version of the document. The reader device includes a keyboard for enabling entry of the document identification data and a display device for visibly displaying the electronic version of the document.

The file folder comprises a body member having an upper margin, a brace located on the upper margin, and a file folder microcontroller unit mounted on the brace; and the file folder memory is mounted on the brace and is coupled to the microcontroller unit.

The storage cabinet includes a cabinet microcontroller unit configured to communicate with the host computer to receive document identification data from the host computer and to distribute document identification data received from the host computer to the file folder microcontroller unit.

The file folder includes a visible indicator mounted adjacent the upper margin; and the file folder microcontroller unit is configured to activate the visible indicator when the file folder microcontroller unit receives document identification data from the cabinet microcontroller unit specifying a document stored in the file folder. The visible indicator is preferably an LED.

From a different aspect, the invention comprises a file folder for use in a document storage and retrieval system having a host computer, a mass storage device containing document identification data and document location data specifying the location of a document in the system, and at least one storage cabinet having at least one drawer for removably receiving file folders containing documents. The file folder comprises a body member having a compartment for removably retaining at least one document, the body member having an upper margin; a support brace located adjacent the upper margin, the support brace having a pair of downwardly opening notches at opposite ends thereof, each notch having electrically conductive members for providing electrical communication with a source of document identification signals; a file folder microcontroller unit mounted on the brace and electrically coupled to the electrically conductive members; a visible indicator mounted adjacent the upper margin and coupled to the file folder microcontroller unit for operation thereby; and a memory mounted on the brace and coupled to the file folder microcontroller unit, the memory containing an electronic version of a document in the compartment.

The file folder is combined with a separate reader device configured to be electrically coupled to the file folder memory to read out the electronic version of a document The reader device includes a keyboard for enabling entry of the document identification data and a display device for visibly displaying the electronic version of the document.

The invention provides enhanced document security by the combination of two design elements in the system. Firstly, the electronic version of each document is not stored in the mass storage device-only the document ID and the cabinet and folder location are stored in mass storage device. Thus, the host computer cannot access the electronic version of any document since this information is never present in the mass storage device. Secondly, the folder memory of each folder is hardware limited to permit only a new document data storage operation in response to a request from the host computer received by the cabinet microcontroller unit. Consequently, the only operation requiring access to folder memory which can be initiated by the host computer is a new document data storage operation For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 4:
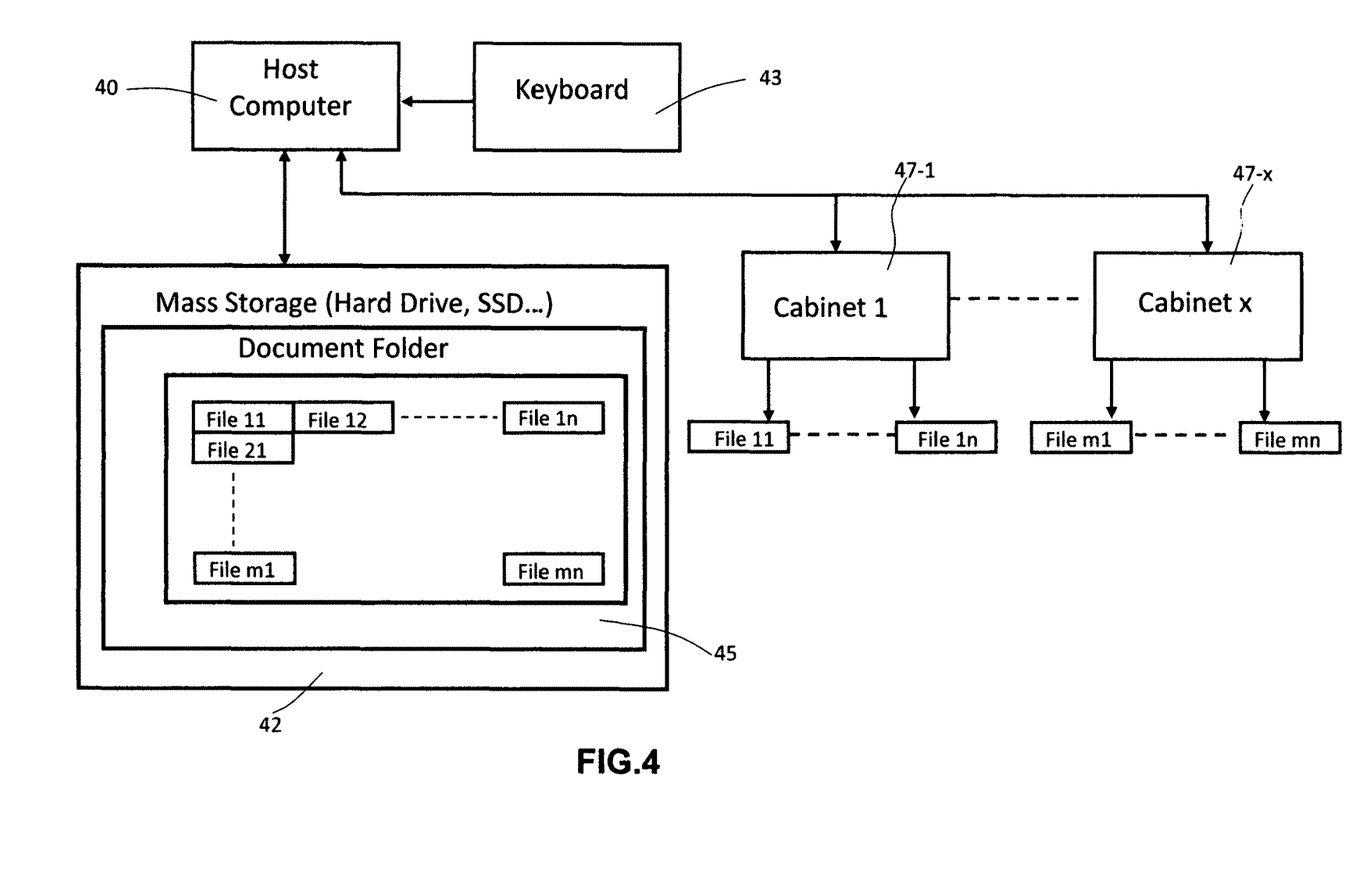
FIG. 4 is a schematic block diagram of a document storage and retrieval system according to the invention.

Turning now to the drawings, FIG. 4 is a schematic block diagram of a document storage and retrieval system according to the invention. As seen in this Fig., a host computer 40 is operatively coupled to a mass storage device 42, in which location information and document identification codes regarding documents registered in the system are stored in electronic form. Unlike the known system described above and illustrated in FIGS. 1-3, mass storage device 42 stores only location information and the identification code for each document registered in the system and not an electronic version of the document itself. The document location information and identification code stored in mass storage device 42 for each document is arranged in virtual document folders-such as folder 45—and the location information and identification code for each document in a given folder 45 is assigned a file designation-such as files 11, 12 . . . , 1$n$, 21, . . . 2$n$, . . . , m1, . . . , mn. Host computer 40 responds to commands issued by an operator using a standard keyboard device 43 by accessing the location information and identification code for each document specified by keyboard device 43 from the corresponding virtual file in mass storage device 42.

In the system of FIG. 4 several storage cabinets 47-1, . . . , 47X are provided which are communicatively coupled to host computer 40 either by means of direct coupling via conductive path 48 or by wireless communication devices (not illustrated). Each cabinet 47*i* has one or more slidable drawers each having a pair if support rails for removably supporting file folders containing one or more physical versions of documents registered in the system. The file folders are logically arranged in a parallel manner to the virtual files in mass storage device 42, so that file 11 of cabinet 1 corresponds to title 11 of document folder 45 in mass storage device 42, file 12 of cabinet 1 corresponds to title 12 of document folder 45 in mass storage device 42, etc.

Figure 5:
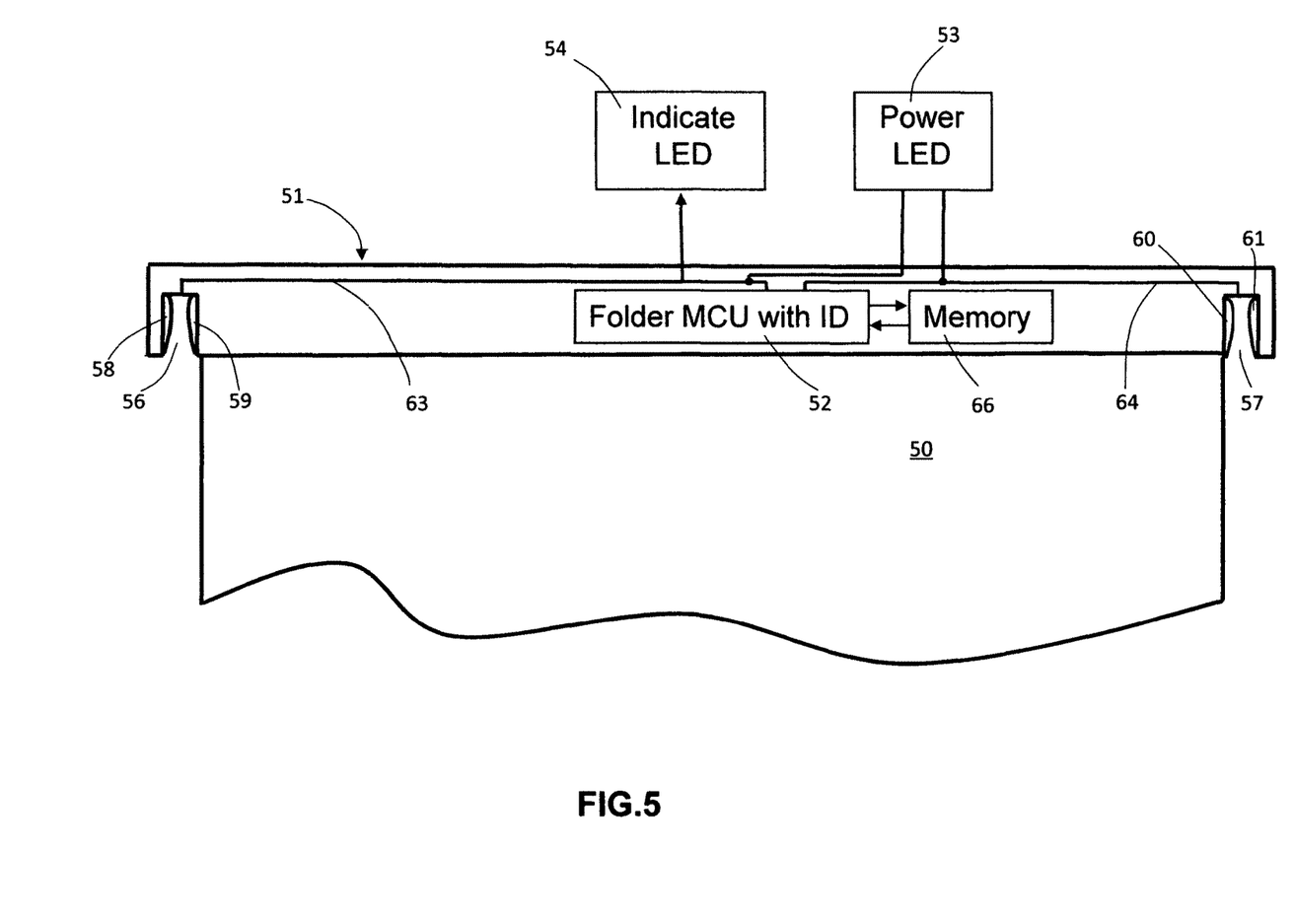
FIG. 5 is a schematic partial block diagram of a file folder support brace with electronic components according to the invention.

Each of the file folders is provided with electronic elements shown in FIG. 5 which enable communication between host computer 40 and the file folders. File folder 50 preferably has the structure and function of the file folder disclosed in commonly assigned U.S. Pat. No. 9,676,223 issued Jun. 13, 2017 for "Secure Document Receptacle", the disclosure of which is hereby incorporated by reference. That file folder provides a compartment for removably retaining one or more documents in a secure manner. As seen in FIG. 5, each file folder 50 has a support brace 51 attached to the upper margin of the main body portion of file folder 50. Support brace 51 is formed from an electrically non-conductive material-such as printed circuit board material- and carries a folder microcontroller unit 52 (MCU 52), a power LED 53 and an Indicate LED 54, both of which are electrically coupled to MCU 52. MCU 52 is preferably a type PCI 10F202 unit available from Microchip Technology of Chandler, Ariz. Support brace 50 has a pair of inverted notches 56, 57 at opposite ends which are dimensioned to receive the cabinet drawer support rails (not illustrated). Each notch 56, 57 is provided with a pair of electrically conductive springs (springs 58, 59 for notch 56; springs 60, 61 for notch 57) which mate with corresponding electrical conductors carried by the drawer support rails (not illustrated) when the folder 50 is properly installed in a cabinet drawer. The electrical conductors carried by the drawer support rails are coupled to host computer 40. Springs 58, 59 are electrically coupled to MCU 52 by conductive paths 63 formed on support brace 51, while springs 60, 61 are electrically coupled to MCU 52 by conductive paths 64 formed on support brace 51. MCU 52 contains a unique identification code character serving to uniquely identify the file folder 50 which contains the MCU 52. Brace 51 also carries a memory unit 66 which has the storage capacity to store the electronic version of each document in physical form contained in a folder 50. Memory unit 66 is preferably a type AT25SF161 16 Mbit device available from Adesto Technologies of Santa Clara, Calofornia.

Figure 6:
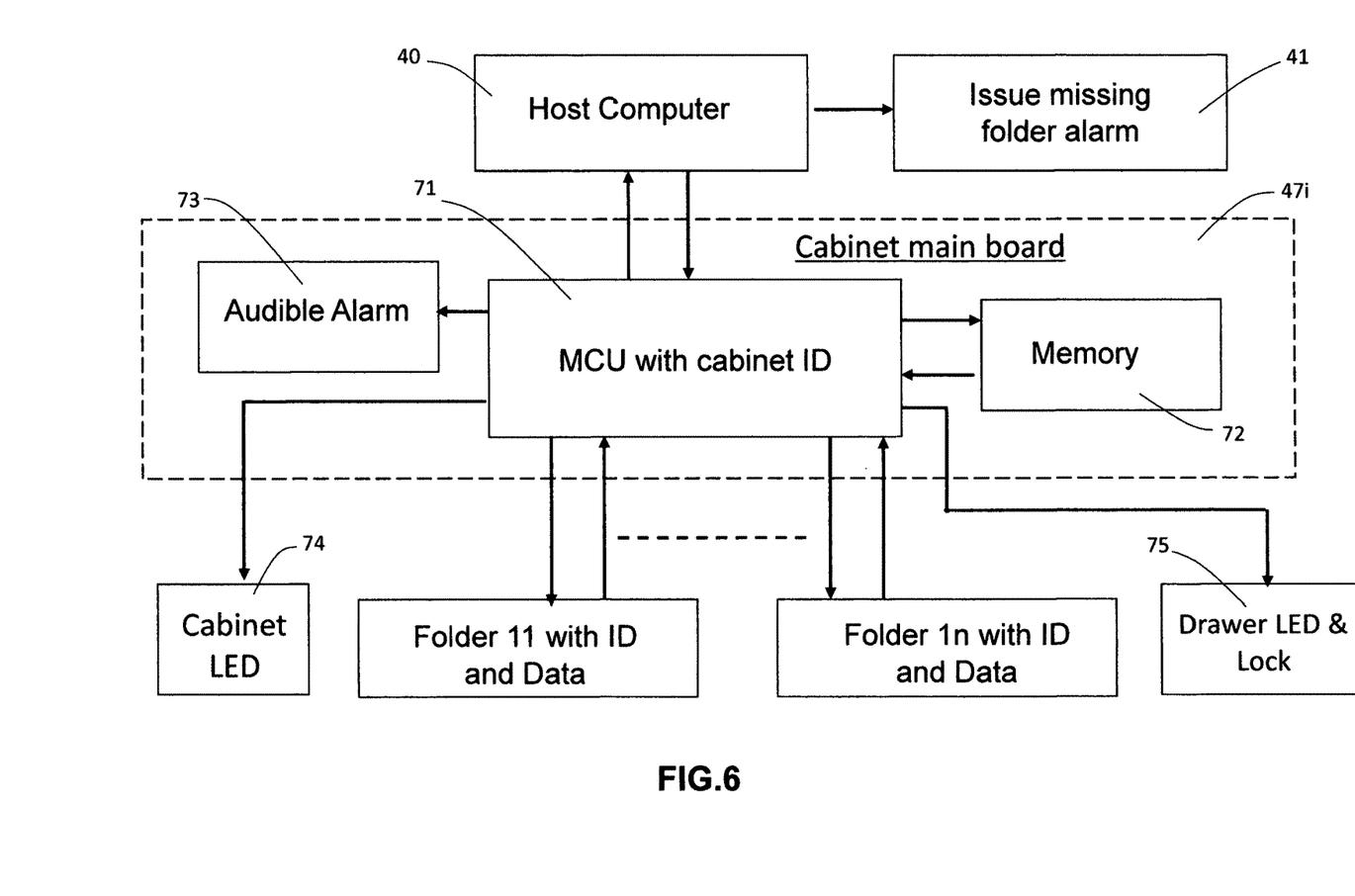
FIG. 6 is a block diagram of the FIG. 4 system illustrating the major cabinet elements of the system.

FIG. 6 is a block diagram of the FIG. 4 system illustrating the major cabinet components of the system. As seen in this Fig., each cabinet 47*i* has a main board depicted with broken lines which contains a cabinet microcontroller unit 71 (MCU 71), an associated cabinet memory unit 72, and an audible alarm unit 73. Cabinet MCU 71 is preferably a type LPC1766 unit available from NXP Semiconductors of Eindhoven, The Netherlands. Cabinet memory unit 72 is preferably a type AT24c02 unit available from Atmel of San Jose, Calif. Audible alarm unit 73 is a conventional device for generating an alarm sound when activated by cabinet MCU 71 in the manner described below. The major cabinet components further include a cabinet LED mounted to the cabinet in a visible location which is illuminated by cabinet MCU 71 when a document code is received from host computer 40 which matches one of the document codes stored in cabinet memory unit 72. Also, a drawer LED and drawer lock unit 75 are included and are also activated by the cabinet MCU 71 in response to the receipt of such a document code by cabinet MCU 71.

Figure 7:
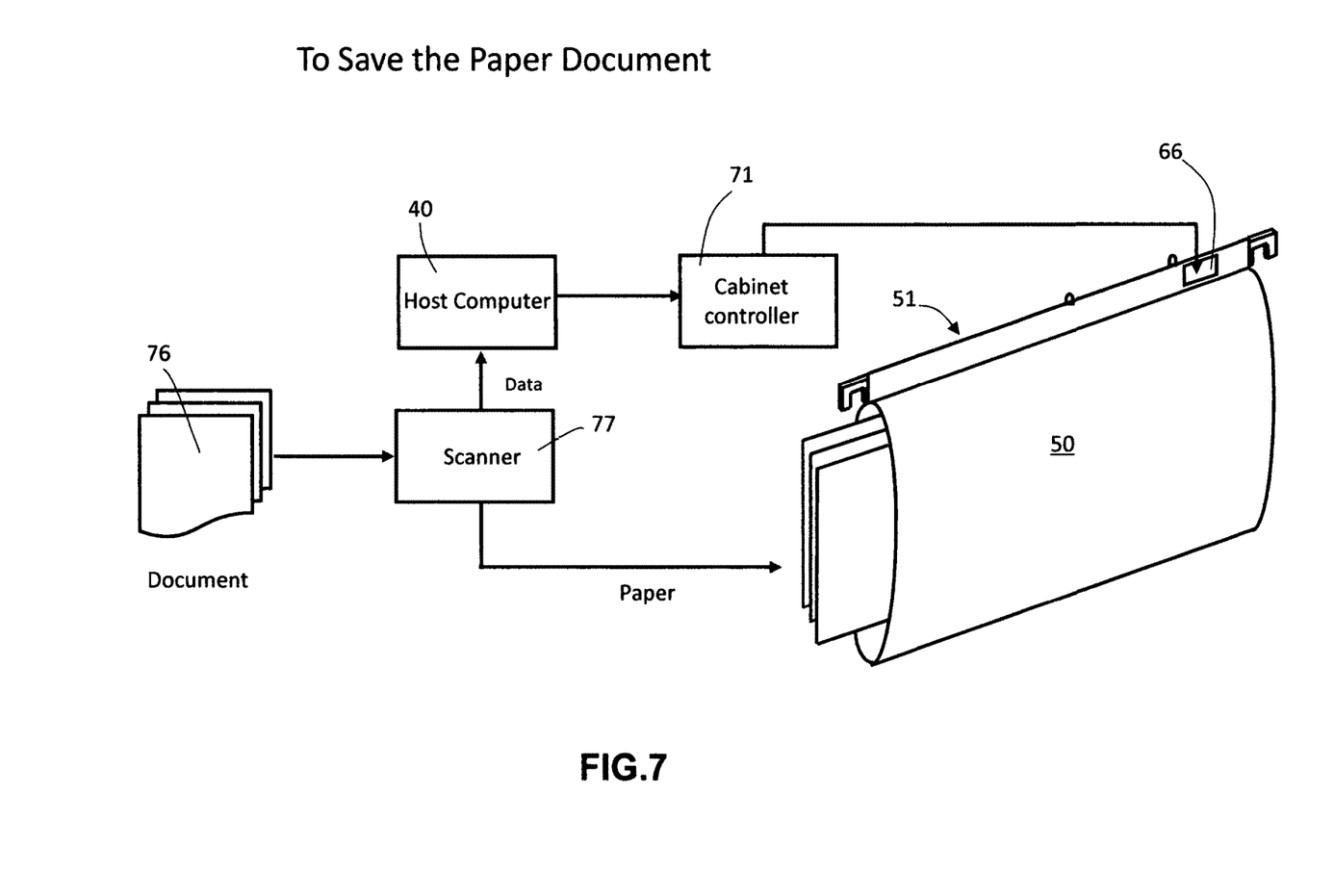
FIG. 7 is a schematic view illustrating the process for preparing a document for storage according to the invention.

FIG. 7 is a schematic view illustrating the process for preparing a document for storage according to the invention. As seen in this Fig., a document 76 is introduced to a conventional document scanner 77 which converts the visible information on the document sheet to an electronic version. This electronic version is supplied to the host computer 40 which creates cabinet and folder location information and a document ID (such as the document title) and sends the data containing the cabinet and folder location as well as the document data to the cabinet controller 71 in the specified cabinet. The cabinet controller 71 sends this information to the specified folder memory 66 where the document ID and document data are stored. The physical version of the document is manually inserted into the folder 50 where the document resides until removed by an authorized user.

Figure 8:
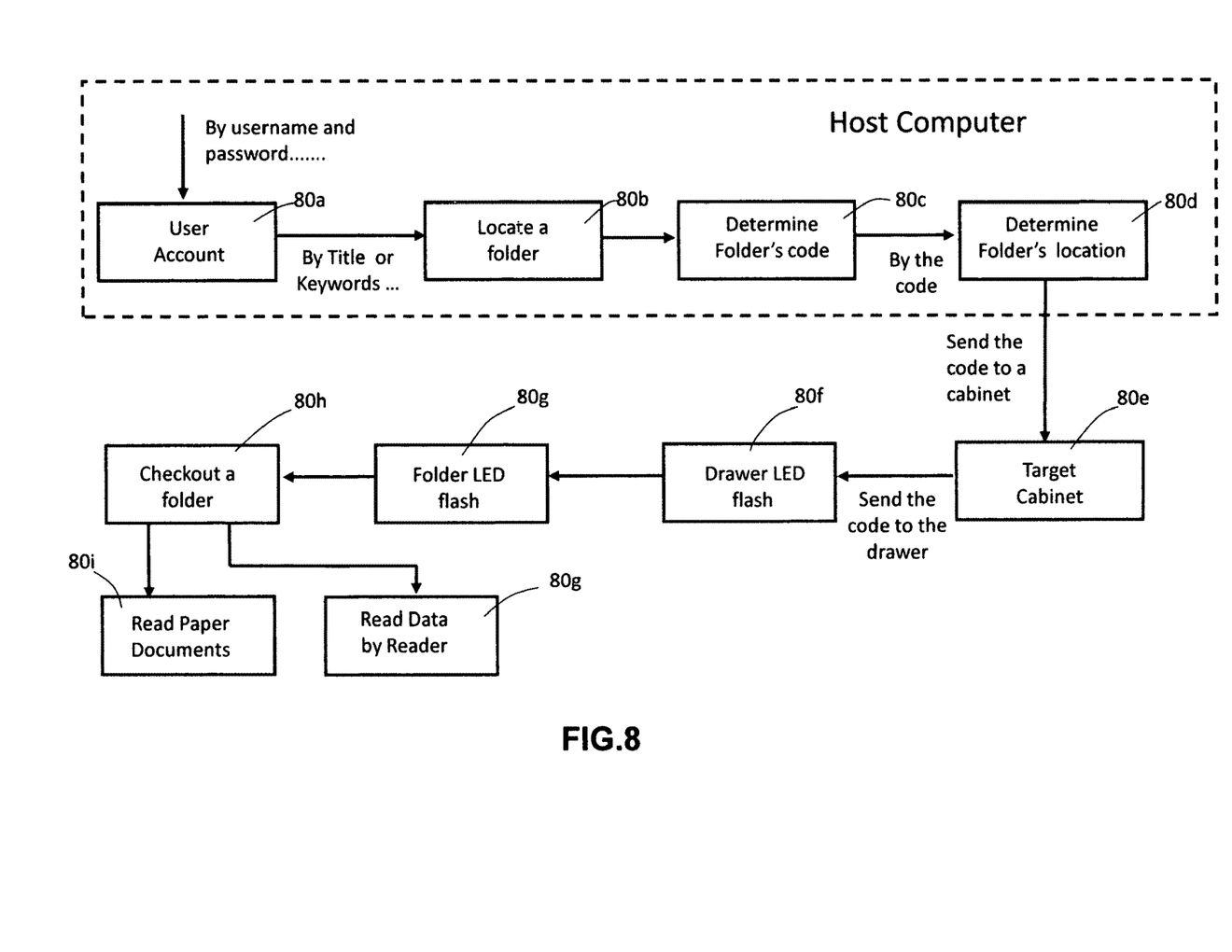
FIG. 8 is a flow chart illustrating the process for accessing a document according to the invention.

FIG. 8 is a flow chart illustrating the process for accessing a document according to the invention. As seen in this Fig., the user gains access to their user account by entering a user name and password into host computer 40 using keyboard device 43 (step 80*a*). Once access is gained the user enters the title or other keywords of the document sought. The host computer 40 uses this information to locate in mass storage device 42 the corresponding virtual folder in which the identification code for each document is stored (step 80*b*). The virtual folder contains the identification code character of the corresponding physical folder 50 (step 80*c*). Host computer 40 uses this identification code character to determine the cabinet and drawer in which the physical folder 50 is located by consulting a table of folder locations (step 80*d*). Once the location of the physical folder 50 is determined, host computer 40 sends the folder identification code character to the destination cabinet and drawer (step 80*e*). Upon receipt of the folder identification code character, cabinet MCU 71 activates the cabinet LED 74 and the drawer LED and lock 75, and sends the code character to MCU 52 of the physical file folder 50 containing the document (step 80*f*). The correct drawer can now be opened by the user guided by the drawer LED. When MCU 52 receives the code character, it activates the Indicate LED 54, which visually alerts the user to the file folder 50 containing the sought document (step 80*g*). The user then removes the found folder 50 and locates the physical version of the sought document (step 80*i*). Alternatively, the user can install the found folder 50 on a reader device to read out the documents contained in found folder memory 66.

Figure 9:
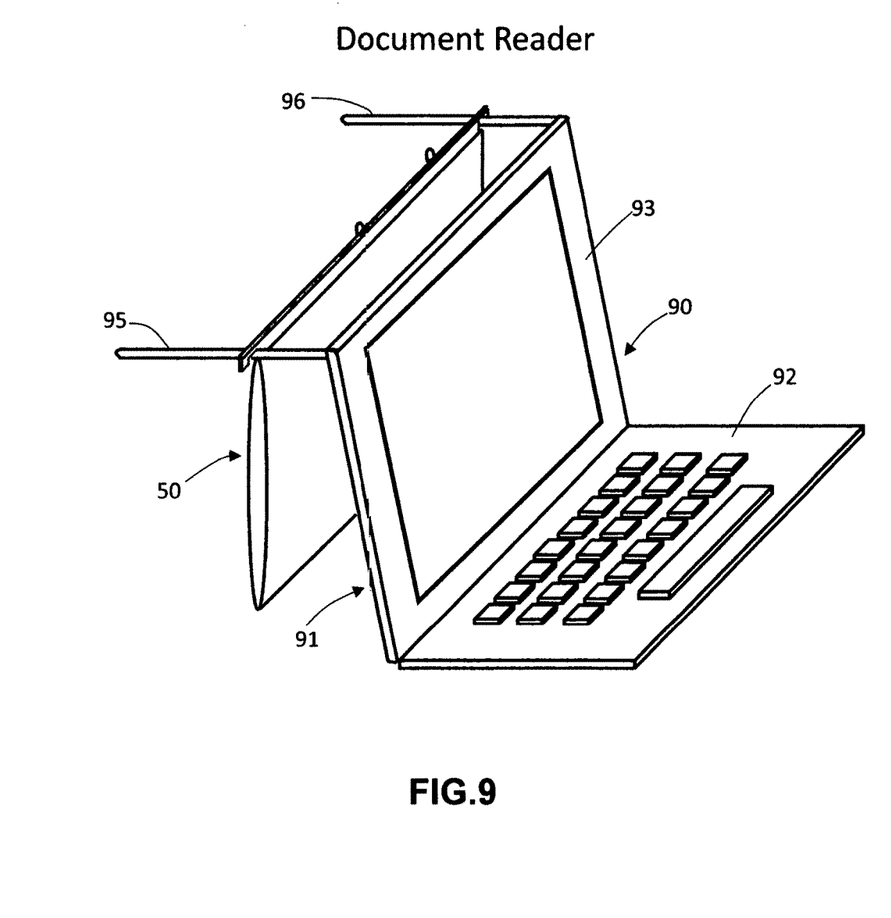
FIG. 9 is a perspective view illustrating a document reader.

FIG. 9 is a perspective view of a reader device 90 for use in reading out the electronic versions of documents stored in folder memory 66. As seen in this Fig., a housing 91 has a keyboard section 92 and a display section 93. Extending away from display section 93 are a pair of probes 95, 96 upon which a folder 50 can be removably supported. Each probe 95, 96 has a pair of electrically conductive paths which ohmically connect the folder MCU 52 in support brace 51 to a reader MCU 98 within housing 91 of reader device 90 (FIG. 10).

Figure 10:
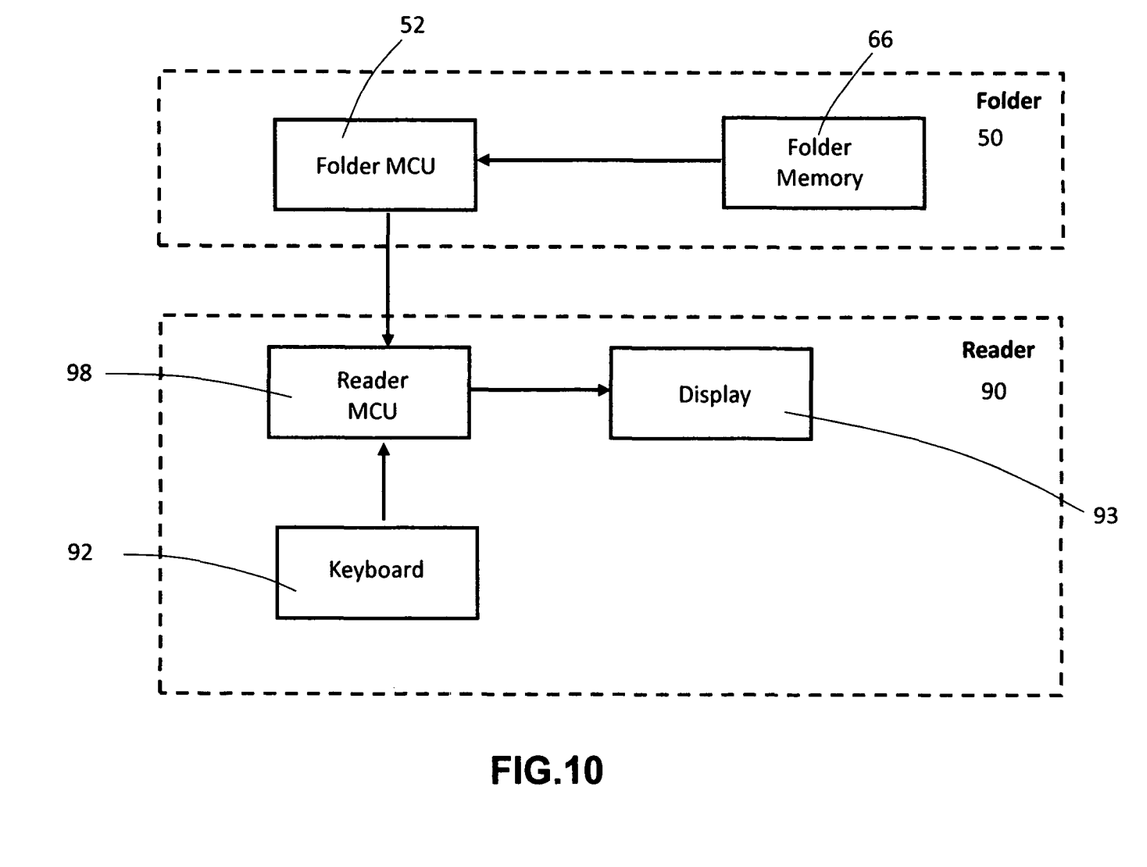
FIG. 10 is a block diagram illustrating the major electronic components of the reader of FIG. 9 and a file folder.

FIG. 10 illustrates the manner in which the electronic versions of documents stored in folder memory 66 can be read by reader device 90. As seen in this Fig., the user operates keyboard 92 to specify the document which is to be read. The keyboard signals are coupled to reader MCU 98 which sends this information to folder MCU 52 via probes 95, 96. In response, the folder MCU 52 searches folder memory 66, retrieves the document data and sends this information to the reader MCU 98. Reader MCU 98 then sends this information to reader display 93.

When the user has finished with the documents in folder 50, the folder 50 is returned to the cabinet drawer, which may then be closed.

An important feature of the invention is the inability of host computer 40 to access the electronic version of any document. This is achieved by the combination of two design elements in the system of FIGS. 4-8. Firstly, the electronic version of each document is not stored in mass storage device 42—only the document ID and the cabinet and folder location are stored in mass storage device 42. Thus, host computer 40 cannot access the electronic version of any document since this information is never present in mass storage device 42. Secondly, the folder memory 66 of each folder 50 is hardware limited to permit only a new document data storage operation in response to a request from host computer 40 received by cabinet MCU 71. Consequently, the only operation requiring access to folder memory 66 which can be initiated by host computer 40 is a new document data storage operation. A preferred form of hardware limitation is to require two different clock speeds for the new document data storage operation and the document data retrieval operation.

As will now be apparent, document storage and retrieval systems incorporating the invention provide heightened security for the contents of documents stored in the system. If unauthorized access to host computer 40 is somehow gained, the maximum amount of information which can be gleaned from the system is the document identifier, such as the document title, and the location in the system of the folder containing the physical version of the document and the electronic version stored in folder memory 66. To gain access to the actual information contained in the document, the unauthorized intruder would have to gain access to the room where the storage cabinet containing the file folder is located, find the cabinet, force open the cabinet drawers, search for the correct file folder, and extract the document. This is a virtually impossible task.

Although the above provides a full and complete disclosure of the preferred embodiments of the invention, various modifications, alternate constructions and equivalents will occur to those skilled in the art. For example, while the invention has been described with reference to specific microcontroller devices, other comparable devices may be employed, depending on the preferences of the system designer. Moreover, while the indicators 27, 56 have been described as visible indicators, other types of indicators, such as audible indicators, may be used, if desired. Further, the invention may be used to manage a file system of many cabinets positioned at different physical locations using an internal or an external computer network, if desired. Therefore, the above should not be construed as limiting the invention, which is defined by the appended claims.

What is claimed is:

1. A document storage and retrieval system comprising:
   a host computer;
   a mass storage device coupled to said host computer, said mass storage device containing document identification data and document location data specifying the location of a document in the system;
   at least one storage cabinet coupled to said host computer, said at least one storage cabinet having at least one drawer for removably receiving file folders containing documents in physical form;
   a file folder removably received in said at least one drawer, said file folder containing at least one document in physical form and having a memory for storing an electronic version of said at least one document, said memory bring configured to be unaccessible by said host computer after said electronic version has been stored therein so that access to the document can only be obtained by removing the file folder from said at least one drawer.

2. The system of claim 1 wherein said host computer and said memory are configured to permit access to said memory by said host computer for the purpose of initially storing said electronic version of said document in said memory and to deny access by said host computer to said electronic version of said document thereafter.

3. The system of claim 1 further including a reader device configured to be electrically coupled to said memory to read out said electronic version of said document.

4. The system of claim 3 wherein said reader device includes a keyboard for enabling entry of said document identification data and a display device for visibly displaying said electronic version of said document.

5. The system of claim 1 wherein said file folder comprises a body member having an upper margin, a brace located on said upper margin, and a file folder microcontroller unit mounted on said brace; and wherein said memory is mounted on said brace and is coupled to said microcontroller unit.

6. The system of claim 5 wherein said at least one storage cabinet includes a cabinet microcontroller unit configured to communicate with said host computer to receive document identification data from said host computer and to distribute document identification data received from said host computer to said file folder microcontroller unit.

7. The system of claim 6 wherein said file folder includes a visible indicator mounted adjacent said upper margin; and wherein said file folder microcontroller unit is configured to activate said visible indicator when said file folder microcontroller unit receives document identification data from said cabinet microcontroller unit specifying a document stored in said file folder.

8. The system of claim 7 wherein said visible indicator is an LED.

9. A file folder for use in a document storage and retrieval system having a host computer, a mass storage device containing document identification data and document location data specifying the location of a document in the system, and at least one storage cabinet having at least one drawer for removably receiving file folders containing documents; said file folder comprising:
   a body member having a compartment for removably retaining at least one document, said body member having an upper margin;
   a support brace located adjacent said upper margin, said support brace having a pair of downwardly opening notches at opposite ends thereof, each notch having electrically conductive members for proving electrical communication with a source of document identification signals;
   a file folder microcontroller unit mounted on said brace and electrically coupled to said electrically conductive members;

a visible indicator mounted adjacent said upper margin and coupled to said file folder microcontroller unit for operation thereby; and a memory mounted on said brace and coupled to said file folder microcontroller unit, said memory containing an electronic version of a document in said compartment.

10. The file folder of claim 9 further including a separate reader device configured to be electrically coupled to said memory to read out said electronic version of said document.

11. The file folder of claim 10 wherein said reader device includes a keyboard for enabling entry of said document identification data and a display device for visibly displaying said electronic version of said document.

\* \* \* \* \*

UNITED STATES PATENT AND TRADEMARK OFFICE
CERTIFICATE OF CORRECTION

PATENT NO. : 10,262,482 B1
APPLICATION NO. : 15/998123
DATED : April 16, 2019
INVENTOR(S) : Zhu et al.

Page 1 of 1

It is certified that error appears in the above-identified patent and that said Letters Patent is hereby corrected as shown below:

On the Title Page

Item (73) Assignee change "MICRODATA CORPORATION" to --Microdata Corporation--

Signed and Sealed this
Sixth Day of August, 2019

Andrei Iancu
*Director of the United States Patent and Trademark Office*